(12) United States Patent
Liu et al.

(10) Patent No.: US 10,506,663 B2
(45) Date of Patent: Dec. 10, 2019

(54) METHOD AND DEVICE FOR DETERMINING CLUSTER-HEADS

(71) Applicant: Telefonaktiebolaget LM Ericsson (publ), Stockholm (SE)

(72) Inventors: Jinhua Liu, Beijing (CN); Zhan Zhang, Beijing (CN); Gabor Fodor, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 32 days.

(21) Appl. No.: 15/547,849

(22) PCT Filed: Jun. 28, 2016

(86) PCT No.: PCT/CN2016/087423
§ 371 (c)(1),
(2) Date: Aug. 1, 2017

(87) PCT Pub. No.: WO2018/000185
PCT Pub. Date: Jan. 4, 2018

(65) Prior Publication Data
US 2018/0242392 A1 Aug. 23, 2018

(51) Int. Cl.
*H04W 84/20* (2009.01)
*H04L 12/755* (2013.01)
(Continued)

(52) U.S. Cl.
CPC ........... *H04W 84/20* (2013.01); *H04L 45/021* (2013.01); *H04L 45/123* (2013.01); *H04L 45/125* (2013.01)

(58) Field of Classification Search
CPC . H04W 84/20; H04W 45/125; H04L 45/021; H04W 45/123
See application file for complete search history.

(56) References Cited

U.S. PATENT DOCUMENTS 7,035,240 B1 * 4/2006 Balakrishnan ........ H04W 84/18
370/338
8,693,345 B2 * 4/2014 Lee ........................ H04L 41/12
370/241
(Continued)

FOREIGN PATENT DOCUMENTS

CN 101594287 A 12/2009
CN 103068073 A 4/2013
(Continued)

OTHER PUBLICATIONS

PCT International Search Report for International application No. PCT/CN2016/087423 dated Mar. 1, 2017.
(Continued)

*Primary Examiner* — Jay P Patel
(74) *Attorney, Agent, or Firm* — Baker Botts, LLP (57) ABSTRACT

Embodiments of the disclosure generally relate to determining cluster-heads for a cluster and operating strategy and methods of the cluster-heads. A device selects candidate cluster-heads from a cluster of devices. Next, the device determines a primary cluster-head for serving the cluster of devices from the candidate cluster-heads. Based on the determined primary cluster-head, the device determines a secondary cluster-head from the candidate cluster-heads. The secondary cluster-head serves the cluster of devices as a supplementary of the primary cluster-head.

28 Claims, 5 Drawing Sheets

(51) Int. Cl.
*H04L 12/721* (2013.01)
*H04L 12/729* (2013.01)

(56) References Cited

U.S. PATENT DOCUMENTS

| | | | |
|---|---|---|---|
| 9,578,635 B2* | 2/2017 | Vannithamby | H04W 4/70 |
| 2013/0094366 A1* | 4/2013 | Lee | H04L 41/14 |
| | | | 370/241 |
| 2014/0092833 A1* | 4/2014 | Vannithamby | H04W 4/70 |
| | | | 370/329 |
| 2014/0304383 A1 | 10/2014 | Guo et al. | |
| 2015/0173011 A1* | 6/2015 | Das | H04W 16/26 |
| | | | 370/328 |
| 2017/0127337 A1* | 5/2017 | Daragon | H04W 40/32 |
| 2017/0366451 A1* | 12/2017 | Schreter | H04L 45/28 |
| 2018/0070287 A1* | 3/2018 | Daragon | H04W 40/32 |
| 2018/0077676 A1* | 3/2018 | Kaloxylos | H04W 84/005 |

FOREIGN PATENT DOCUMENTS

| | | |
|---|---|---|
| CN | 103596203 A | 2/2014 |
| WO | 2015043687 A1 | 12/2009 |

OTHER PUBLICATIONS

PCT Written Opinion of the International Searching Authority for International application No. PCT/CN2016/087423 dated Mar. 1, 2017.
WCA: A Weighted Clustering Algorithm for Mobile AD HOC Networks by Mainak Chatterjee et al.; Center for Research in Wireless Mobility and Networking, Department of Computer Science and Engineering, University of Texas at Arlington, Arlington, TX; Cluster Computing 5, 193-204; 2002 Kluwer Academic Publishers. Manufactured in The Netherlands—2002.
Device-to-Device Communications for National Security and Public Safety by Gabor Fodor et al.; Special Section on 5G Wireless Technologies: Perspectives of the Next Generation Mobile Communications and Networking; IEEE Access—Jan. 2, 2015.

* cited by examiner

METHOD AND DEVICE FOR DETERMINING CLUSTER-HEADS

PRIORITY

This nonprovisional application is a U.S. National Stage Filing under 35 U.S.C. § 371 of International Patent Application Serial No. PCT/CN2016/087423 filed Jun. 28, 2016, and entitled "Method And Device For Determining Cluster-Heads."

TECHNICAL FIELD

Embodiments of the present disclosure generally relate to the field of communications, and more particularly, to a method and device for determining cluster-heads and operating strategy of the cluster-heads.

BACKGROUND

In integrated cellular and adhoc networks, low frequency bands dedicated to cellular operators and Millimetre Wave (mmW) bands are usually utilized. And, adhoc network is usually partially unlicensed or lightly licensed. The adhoc network is generally implemented in a flat structure or a hierarchical structure. In the hierarchical structure, devices in the network (such as access points and terminal devices) are divided into a plurality of clusters, each cluster including a cluster-head (CH) and one or more cluster-members that are slaves to the cluster-head.

A cluster-head may be compared to a small range base station that, in the absence of a cellular eNB, provides (a subset of and) similar functionality as an eNB. For example, a cluster-head can provide synchronization and radio resource management within its cluster and also act as a central node to create a tree topology for communication with the cluster. In addition, the cluster-head can also provide a relaying functionality towards other clusters or towards a cellular eNB.

In some of the integrated cellular and adhoc networks, multi-node connectivity is employed to reduce radio link failures and enhance robustness. More specifically, in order to enhance robustness and seamlessness of cluster operations, such as in radio resource management and data packet relaying, multiple cluster-heads can be used in a cluster of devices to serve the devices in the cluster. However, in some cases, when a cluster member connects to the cluster-heads at the same time, it neither knows which cluster-head can provide a better service, nor which protocol should be used in connecting to a cluster-head. Furthermore, since there are several cluster-heads in one cluster, when multiple cluster-heads use diverse (scheduled and contention based) protocols, such as Media Control Access (MAC) protocols, the connection of cluster members to the cluster-heads is problematic. As a result, failures often occur in radio links between the cluster members and the cluster-heads, and thus robustness of communication of the cluster is deteriorated.

This problem is particularly severe in case of high mobility of a cluster member, when the cluster member needs to reconnect to cluster-heads but maintain wireless connectivity ("make before break") during mobility between cluster-heads that may employ either same or diverse MAC protocols. For example, when a cluster-head moves out of the coverage of a cellular base station (BS) into the coverage area of an mmW pico BS or a cluster member moves out of one coverage of one cluster-head, there may be some problems with the connection of the cluster member to the cluster-heads.

SUMMARY

In general, embodiments of the present disclosure provide a solution for determining multiple cluster-heads to mitigate the problem caused by mobility and diverse protocols in mixed licensed/unlicensed environments.

In a first aspect, a method at least partially implemented at a device is provided. The device selects candidate cluster-heads from a cluster of devices. Then, the device determines a primary cluster-head for serving the cluster of devices from the candidate cluster-heads. Based on the primary cluster-head, the device determines a secondary cluster-head from the candidate cluster-heads. The secondary cluster-head serves the cluster of devices as a supplementary of the primary cluster-head. The corresponding computer program is also provided.

In one embodiment, selecting the candidate cluster-heads may include: determining capability metrics of devices in the cluster, the capability metrics including at least one of: data-path-latency status, interference status, link budget, capability of multiple operating carriers, media-access-control features, and reachability in term of radio coverage; ranking the devices in the cluster based on the determined capability metrics; and selecting the candidate cluster-heads from the devices in the cluster based on the ranking.

In one embodiment, selecting the candidate cluster-heads may include: receiving votes from the devices in the cluster, each of the votes indicating a candidate cluster-head that is preferred by one of the devices; and selecting the candidate cluster-heads from the devices based on the votes.

In one embodiment, determining the primary cluster-head may include: determining capability metrics of the candidate cluster-heads, the capability metrics including at least one of: data-path-latency status, interference status, link budget, capability of multiple operating carriers, media-access-control features, and reachability in term of radio coverage; and determining, as the primary cluster-head, one of the candidate cluster-heads with the determined capability metric meeting a predetermined criterion.

In one embodiment, determining the primary cluster-head may include: receiving votes from the candidate cluster-heads, each of the votes indicating a primary cluster-head that is preferred by one of the devices; and determining, as the primary cluster-head, one of the candidate cluster-heads with the vote meeting a predetermined criterion.

In one embodiment, determining the secondary cluster-head may include: obtaining operating information of the candidate cluster-heads other than the primary cluster-head, the operating information including at least one of: operating protocols, operating bands and capabilities of inter-cluster-head communications; and determining the secondary cluster-head based on the operating information.

In one embodiment, determining the secondary cluster-head may include: receiving a recommendation of the secondary cluster-head from the primary cluster-head, the recommendation being determined based on operating information of the candidate cluster-heads other than the primary cluster-head, the operating information including at least one of: operating protocols, operating bands, and suitability of inter-cluster-head communications; and determining the secondary cluster-head based on the recommendation.

In one embodiment, the method may further include: in response to a predetermined event, selecting the secondary cluster-head as a new primary cluster-head. The predetermined event may include at least one of the following: a capability metric of the secondary cluster-head being better than a capability metric of the primary cluster-head, a link quality of the primary cluster-head to a network node being lower than a link quality of the secondary cluster-head, and a device in the cluster losing a connection to the primary cluster-head and setting up a connection to the secondary cluster-head.

In one embodiment, the primary cluster-head may send a context of a device in the cluster served by the primary cluster-head to the new primary cluster-head.

In one embodiment, the method may further include: in response to a change of at least one of the primary cluster-head and the secondary cluster-head, sending information about the change to a device in the cluster served by the primary cluster-head or the secondary cluster-head and to a network node.

In one embodiment, the method may further include: in response to a change of the secondary cluster-head, sending control channel configuration of the secondary cluster-head to a device in the cluster.

In one embodiment, the method may further include: sending, to the secondary cluster-head, a context of a device in the cluster served by the primary cluster-head to facilitate a connection to be set up between the device in the cluster and the secondary cluster-head.

In one embodiment, the primary cluster-head and the secondary cluster-head may be specific to a device in the cluster.

In one embodiment, a device in the cluster may connect to both the primary cluster-head and the secondary cluster-head according to a load balance rule. The load balance rule may relate to at least one of: power consumption, radio resource, processing energy, and spectrum spatially reuse.

In one embodiment, the primary cluster-head may have a higher priority than the secondary cluster-head. In one embodiment, if a network node fails to transmit a signal to the primary cluster-head, the network node may transmit the signal to the secondary cluster-head to facilitate the signal to be forwarded to a device in the cluster.

In a second aspect, a device is provided. The device includes a processing unit. The processing unit is configured to select candidate cluster-heads from a cluster of devices; determine a primary cluster-head for serving the cluster of devices from the candidate cluster-heads; and determine a secondary cluster-head from the candidate cluster-heads based on the primary cluster-head. The secondary cluster-head serves the cluster of devices as a supplementary of the primary cluster-head.

In a third aspect, a device is provided. The device includes a processor and a memory. The memory containing instructions executable by the processor, whereby the processor being adapted to cause the device to perform the method according to the first aspect of the present disclosure.

According to some embodiments of the present disclosure, robustness of cluster-head coordination, for example, in situations where cluster-heads use diverse protocols, can be improved. In addition, workload among cluster-heads can be balanced, especially for high Device-to-Device (D2D) load cases.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "network node" refers to a node in a wireless communication network via which a terminal device accesses the network and receives services therefrom. The network node refers a base station (BS), an access point (AP), a Mobile Management Entity (MME), Multi-cell/Multicast Coordination Entity (MCE), a gateway, a server, a controller or any other suitable device in the wireless communication network. The BS may be, for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" refers to any end device that can access a wireless communication network and receive services therefrom. By way of example and not limitation, the terminal device refers to a mobile terminal, UE, or other suitable device. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, a pedestrian and the like.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
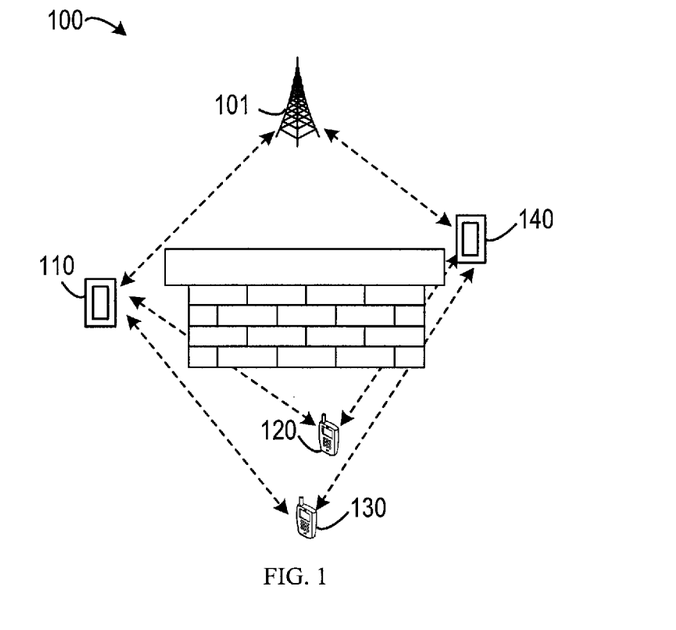
FIG. 1 shows an environment 100 in which embodiments of the present disclosure may be implemented.

Reference is first made to FIG. 1, which illustrates an environment 100 in which embodiments of the present disclosure may be implemented. The environment 100 illustrates a cluster of devices 110 to 140. The devices in the cluster may be fixed access points, terminal devices and/or any other suitable devices. In the example of FIG. 1, devices 110 and 140 may act as cluster-heads, and device 120 and 130 may act as cluster members served by the cluster heads 110 and 140. The device acting as a cluster-head may be a fixed access point, a terminal device and/or any other suitable device. The device acting as a cluster member may be a terminal device served by the cluster-heads, which is also called as a "slave device" hereafter. In the example of FIG. 1, the cluster-heads 110 and 140 connect to a network node 101 (for example, a mobility control entity or a cellular eNB) at the network side (for example, the core network). The cluster-heads 110 and 140 provide synchronization and radio resource management within the cluster and provide a relaying functionality towards other clusters or towards the network node 101.

Conventionally, when a cluster member 120 or 130 connects to the cluster-heads 110 and 140 at the same time, it does not know which cluster-head can provide a better service. Furthermore, it also does not know which protocol should be used in connecting to the cluster-head. As such, failures often occur in radio links between the cluster members and the cluster-heads, leading to poor robustness of communication of the cluster.

In order to solve the above and other potential problems, embodiments of the present disclosure provides a solution to the multiple cluster-head diversity (MCHD). In accordance with embodiments of the present disclosure, a primary cluster-head is determined from a set of candidate cluster-heads for serving the cluster of devices. Based on the primary cluster-head, at least one secondary cluster-head is determined from the set of candidate cluster-heads to serve the cluster of devices as a supplementary of the primary cluster-head. The mechanism provided by embodiments of the present disclosure allows cluster members to use multiple protocols (for example, MAC protocols) towards the primary cluster-head and the secondary cluster-head(s). In this way, the problem of diverse MAC protocols in mixed licensed/unlicensed environments can be mitigated, and robustness of communication of the cluster can be improved.

It is to be understood that the configuration of FIG. 1 is described merely for the purpose of illustration, without suggesting any limitation as to the scope of the present disclosure. Those skilled in the art will appreciate that the environment 100 may include any suitable number of cluster-heads and cluster members in a cluster.

Figure 2:
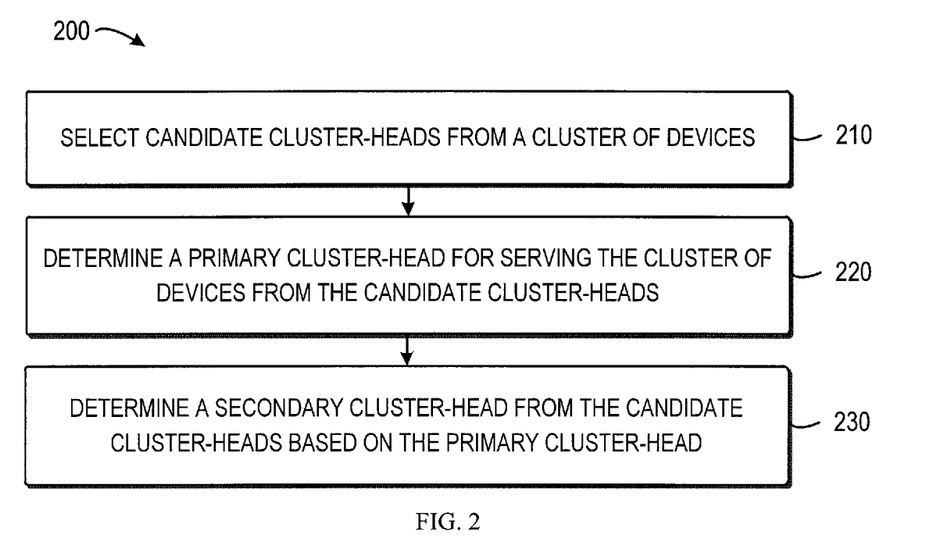
FIG. 2 shows a flowchart of a method 200 for determining the primary cluster-heads and the secondary cluster-head in accordance with an embodiment of the present disclosure.

Now reference is made to FIG. 2, which shows a flowchart of a method 200 for determining the primary cluster-heads and the secondary cluster-head in accordance with an embodiment of the present disclosure. With the method 200, the above and other potential deficiencies in the conventional approaches can be overcome. It would be appreciated by those skilled in the art that the method 200 may be implemented by a device, such as the cluster-head 110 or 140, the network node 101, a controller or a server in or out of the cluster, or other suitable devices. For purpose of illustration, one secondary cluster-head, for example, 140 is described in embodiments of the present disclosure. It is to be understood that this is only an example. Those skilled in the art would appreciate that there may be more than one secondary cluster-heads in one cluster.

The method 200 is entered in block 210, where candidate cluster-heads are selected from a cluster of devices. The candidate cluster-heads are candidates that are to be act as the cluster-heads for the cluster. In some embodiments, one of the candidate cluster-heads is selected as the primary cluster-head, and the others are all determined as the secondary cluster-heads. Alternatively, one of the candidate cluster-heads is selected as the primary cluster-head, and some of the remaining candidate cluster-heads are selected as the secondary cluster-heads. In this case, there may be one or more candidate cluster-heads are not used as a real cluster-head.

In accordance with embodiments of the present disclosure, the candidate cluster-heads may be selected in a variety of ways. In some embodiments, the candidate cluster-heads may be determined according to their respective capability metrics. The capability metrics may include, for example, but not limited to, data-path-latency status, interference status, link budget, capability of multiple operating carriers, media-access-control features, reachability in term of radio coverage, and/or the like. As an example, the interference status indicates the interference to a device in the cluster, and may be reflected by a signal quality, such as, Signal to Interference plus Noise Ratio (SINR), and so on.

Figure 3:
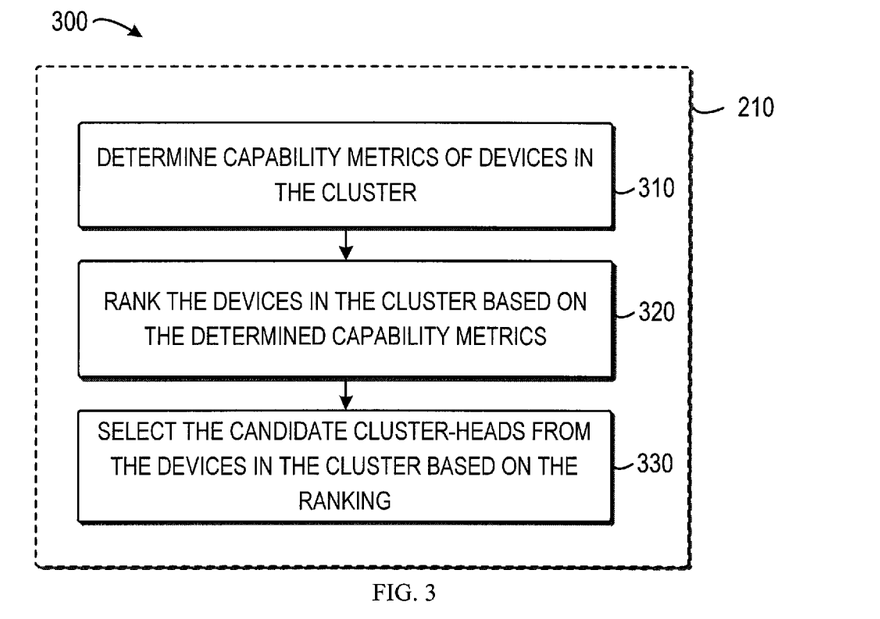
FIG. 3 shows a flowchart of a method 300 for selecting candidate cluster-heads in accordance with an embodiment of the present disclosure.

FIG. 3 shows a flowchart of a method 300 for selecting candidate cluster-heads in accordance with such embodiments of the present disclosure. In the embodiments described with reference to FIG. 3, capability metrics of devices in the cluster are determined in block 310. Next, in block 320, the devices in the cluster are ranked based on the determined capability metrics. Then, in block 330, the candidate cluster-heads are selected from the devices in the cluster based on the ranking. In the example of FIG. 1, assuming that there are four devices 110-140 in a cluster, the capability metrics are implemented as interference statuses (denoted as $I_{110}$, $I_{120}$, $I_{130}$, and $I_{140}$) to the device 110-140 may be ranked as $I_{110} < I_{140} < I_{130} < I_{120}$. In an embodiment, assuming that both $I_{110}$ and $I_{140}$ are less than a predetermined inference threshold, the devices 110 and 140 are thus determined as the candidate cluster-heads. Alternatively, in another embodiment, assuming that the number of the candidate cluster-heads is predefined, for example, 2, the devices 110 and 140 whose interferences are lower than other devices may be determined as the candidate cluster-heads. It is to be understood that the above examples are illustrated for discussion, rather than limitation. Those skilled in the art would readily appreciate that there are many other ways for selecting the candidate cluster-heads according to capability metrics of the devices in the cluster.

Figure 4:
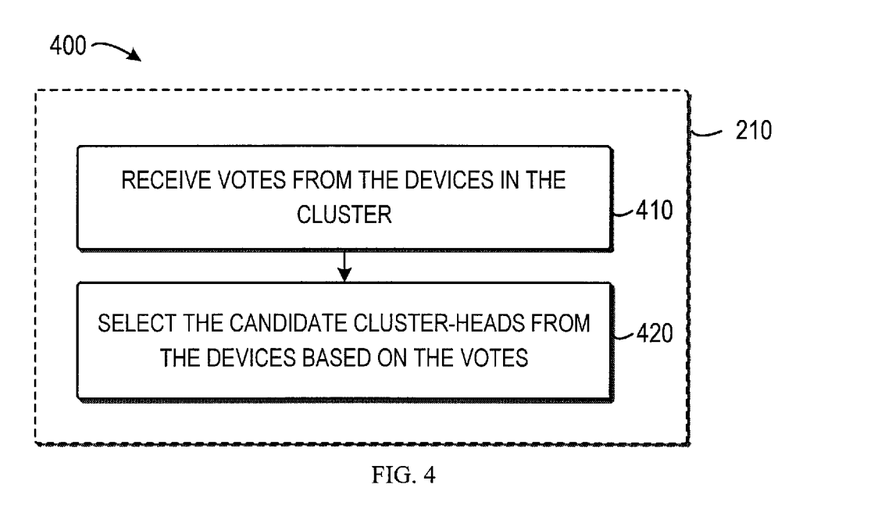
FIG. 4 shows a flowchart of a method 400 for selecting candidate cluster-heads in accordance with another embodiment of the present disclosure.

Alternatively, in some embodiments, the candidate cluster-heads may be selected according to votes from devices in the cluster. A vote may indicate a candidate cluster-head that is preferred by one of the devices in the cluster. FIG. 4 shows a flowchart of a method 400 for selecting candidate cluster-heads in accordance with such embodiments of the present disclosure. In the embodiments described with reference to FIG. 4, each device in the cluster select a preferred primary cluster-head for the other devices in the cluster according to a certain criteria, for example, the pass loss therebetween, and send a vote to indicate the preferred primary cluster-head. In block 410, votes are received from the devices in the cluster. Then, in block 420, the candidate cluster-heads are determined from the devices based on the votes. For instance, if the votes about a device in the cluster exceeding a predetermined vote threshold, for example, 3 votes, the device may be determined as a cluster-head. Alternatively, if the number of the candidate cluster-heads is predefined as 2, for example, the first two devices having most votes may be determined as the candidate cluster-heads. The number of the candidate cluster-heads may be preconfigured by the network side (such as the network node 101) by RRC signaling. Additionally, in some embodiments, if there is a tie in the votes, some other metrics may be used to solve the tie, such as using current loading of nodes to choose the one from the tie, or its grades of signal processing capability as a metric.

Still referring to FIG. 2, in block 220, a primary cluster-head for serving the cluster of devices is determined from the candidate cluster-heads. The primary cluster-head generally has a higher priority than the secondary cluster-head in several aspects, such as radio resource management, signal relaying, and/or the like.

The network side (for example, the network node 101) may use both the primary cluster-head (for example, the cluster-head 110) and the secondary cluster-head (for example, the cluster-head 140) to serve the cluster members (for example, the cluster members 120 and 130). In some embodiments, a radio resource request may be sent from a cluster member to the primary cluster-head 110 first. If a pre-set condition is met, such as no response from the primary cluster-head in a pre-configured time duration, the radio resource request may be sent to the secondary cluster-head 140 instead.

Figure 5:
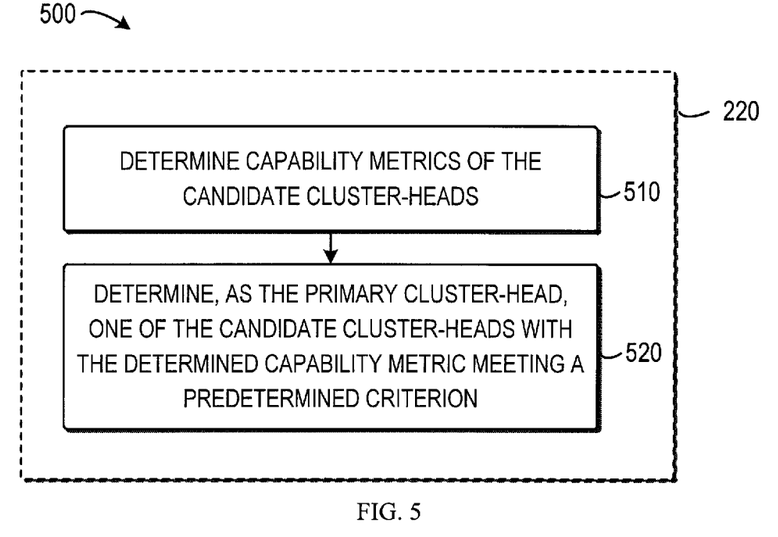
FIG. 5 shows a flowchart of a method 500 for determining a primary cluster-head in accordance with an embodiment of the present disclosure.

According to embodiments of the present disclosure, the primary cluster-head may be determined in a variety of ways. In some embodiments, capability metrics are used in determining the primary cluster-head. FIG. 5 shows a flowchart of a method 500 for determining a primary cluster-head in accordance with such embodiments of the present disclosure. In the embodiments described with reference to FIG. 5, in block 510, capability metrics of the candidate cluster-heads are determined. The capability metrics, as discussed above, may include data-path-latency status, interference status, link budget, capability of multiple operating carriers, media-access-control features, reachability in term of radio coverage, and/or the like. Then, in block 520, one of the candidate cluster-heads with the determined capability metric meeting a predetermined criterion is determined as the primary cluster-head. It is to be understood that the capability metrics determined in block 510 may be obtained from those already determined in block 310, or may be determined independently. The predetermined criterion may be implemented in a variety of ways. In an embodiment, the candidate cluster-head that has the best capability metric (for example, lowest data-path-latency, lowest interference, largest link budget, best capability of multiple operating carriers, or best reachability) may be determined as the primary cluster-head that meets the predetermined criterion. Alternatively, a set of candidates with capability metrics exceeding a predetermined threshold may be selected first, and then the primary cluster-head may be selected from the set of candidates. As a further alternative, a candidate cluster-head capable of supporting operations at all MAC protocols and mechanisms of all the members of the cluster may be selected as a primary cluster-head. In this case, a less capable candidate cluster-head may be selected as a secondary one.

Figure 6:
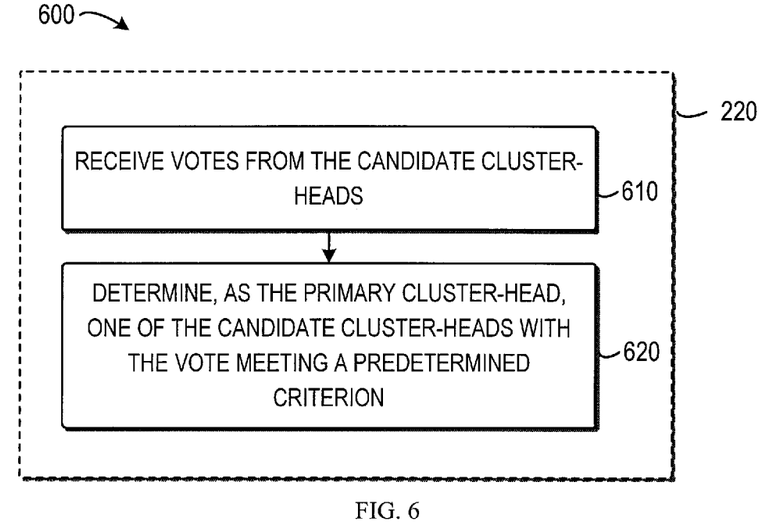
FIG. 6 shows a flowchart of a method 600 for determining a primary cluster-head in accordance with another embodiment of the present disclosure.

Alternatively, in some embodiments, the primary cluster-head may be determined based on votes of the candidate cluster-heads. FIG. 6 shows a flowchart of a method 600 for determining a primary cluster-head in accordance with such embodiments of the present disclosure. In the embodiments described with reference to FIG. 6, in block 610, votes may be received from the candidate cluster-heads. Each of the votes may indicate a primary cluster-head that is preferred by one of the devices in the cluster. Then, in block 620, one of the candidate cluster-heads with the vote meeting a predetermined criterion may be determined as the primary cluster-head.

Still referring to FIG. 2, in block 230, a secondary cluster-head from the candidate cluster-heads is determined based on the primary cluster-head. The secondary cluster-head serves the cluster of devices as a supplementary of the primary cluster-head. It is to be understood that although the embodiments of FIG. 2 only mention one secondary cluster-head, those skilled in the art would appreciate that there may be more than one secondary cluster-head in some other embodiments.

Figure 7:
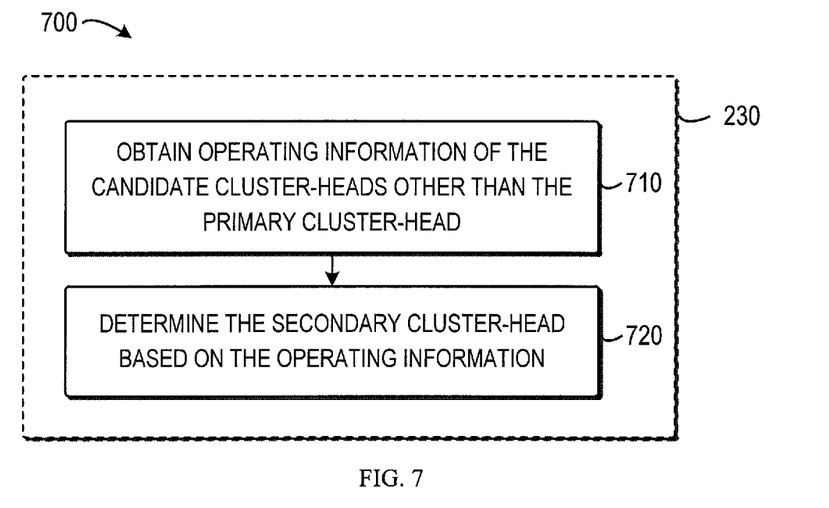
FIG. 7 shows a flowchart of a method 700 for determining a secondary cluster-head in accordance with an embodiment of the present disclosure.

In accordance with embodiments of the present disclosure, the secondary cluster-heads may be determined in a variety of ways. In some embodiments, the secondary cluster-head may be determined based on operating information of the candidate cluster-heads. The operating information may include, but not limited to, operating protocols, operating bands, capabilities of inter-cluster-head communications, and/or the like. FIG. 7 shows a flowchart of a method 700 for determining a secondary cluster-head in accordance with such embodiments of the present disclosure. In the embodiments described with reference to FIG. 7, operating information of the candidate cluster-heads other than the primary cluster-head is obtained in block 710. Then, in block 720, the secondary cluster-head is determined based on the operating information.

Alternatively, in some embodiments, a secondary cluster-head may be determined in the same time of determining the primary cluster-head, for example, as a device whose votes are just lower than the primary cluster-head. When there is a tie in the votes, some other metrics may be used to solve the tie, such as using current loading of devices in the cluster to choose the one from the tie, or grades of signal processing capability as a metric to decide the secondary cluster-head.

Figure 8:
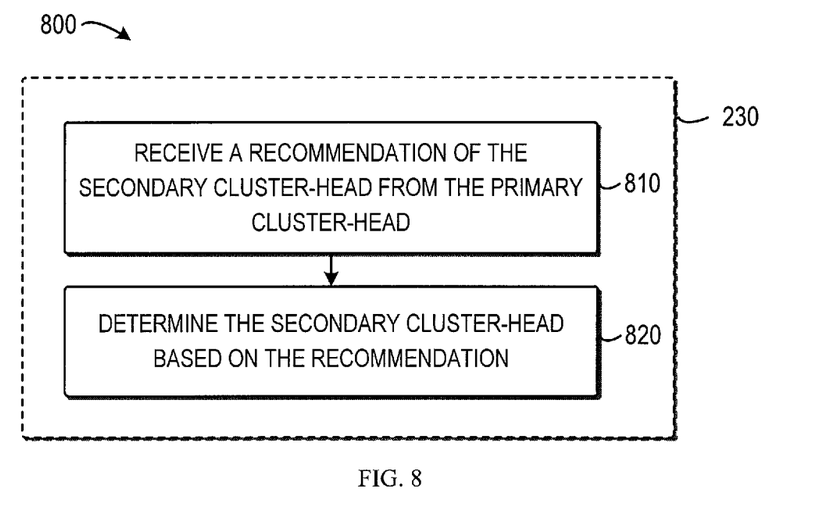
FIG. 8 shows a flowchart of a method 800 for determining a secondary cluster-head in accordance with another embodiment of the present disclosure.

Alternatively, in some embodiments, the secondary cluster-head may be determined based on a recommendation from the primary cluster-head. The recommendation indicates a nomination made by the primary cluster-head and may be determined at the primary cluster-head based on operating information of the candidate cluster-heads other than the primary cluster-head. The operating information may include operating protocols, operating bands, capabilities of inter-cluster-head communications, and/or the like. The capabilities of inter-cluster-head communications may indicate whether a candidate cluster-head is a most suitable one in term of inter-CH communications. FIG. 8 shows a flowchart of a method 800 for determining a secondary cluster-head in accordance with such embodiments of the present disclosure. In the embodiments described with reference to FIG. 8, a recommendation of the secondary cluster-head is received from the primary cluster-head in block 810, and then the secondary cluster-head is determined based on the recommendation in block 820. In an embodiment, the secondary cluster-head may be nominated by the primary cluster-head for each cluster member according to its MAC operating protocols so that each cluster member may be associated with a cluster-head for each of its different MAC operating protocols. Alternatively, the secondary cluster-head may be nominated by the primary cluster-head for each cluster member according to its operating bands, for example, according to link quality status at a different band to the candidate cluster-heads. As a further alternative, the secondary cluster-head may be nominated by the primary cluster-head according to its perception on whether a candidate cluster-head is a most suitable one in term of inter-CH communications. Such capabilities of inter-cluster-head communications may be determined, for example, according to link quality between the primary cluster-head and other candidate cluster-heads, or available Channel State Information (CSI) at the primary cluster-head.

The primary and secondary cluster-heads may be aware of serving a same device (for example, a UE) in the cluster through info updating between them. They may exchange their own records about the UE's context. In case of possible link failure between one of the primary and secondary cluster-heads to the UE, the other one of the cluster-heads may get prepared to take the responsibility originally taken by the failed cluster head. In some embodiments, a context of a device in the cluster served by the primary cluster-head (that is, a slave device of the primary cluster-head) may be sent to the secondary cluster-head, to facilitate a connection to be set up between the slave device and the secondary cluster-head.

In some embodiments, a device in the cluster may connect to either or both of the primary cluster-head and the secondary cluster-head according to a load balance rule. The load balance rule may relate to power consumption, radio resource, processing energy, and spectrum spatially reuse and/or other relevant factors. It is to be understood that in embodiments of the present disclosure, for each cluster, there may be one primary cluster-head and one or more secondary cluster-heads. In some cases, the primary and secondary cluster-head are shared by all devices in the cluster. As an alternative, the primary cluster-head and the secondary cluster-head may be specific to each device in the cluster. In the example of FIG. 1, the cluster-head 110 may act as the primary cluster-head of the device 120 and act as the secondary cluster-head of the device 130, and the cluster-head 140 may act as the primary cluster-head of the device 130 and act as the secondary cluster-head of the device 120. This helps share the load between cluster members. Optionally, synchronization signaling, announcing beacon for discovery, and radio resource management (RRM) tasks are provided simultaneously or in a round robin fashion by these cluster-heads.

A cluster member (for example, the device 120 in the cluster) may request radio resource firstly from its primary cluster-head when trying to sending data or signaling either to the network side (for example, the network node 101) or another cluster member. After pre-configured or defined time duration from certain contacting requests, still no response from the primary cluster-head is received, the cluster member may send request to their secondary cluster-head(s) for requesting radio resources.

On the other hand, if a network node fails to transmit a signal (such as payload data or control data) to the primary cluster-head, the network node transmits the signal to the secondary cluster-head to facilitate the signal to be transmitted to a device in the cluster. When the network node has data for a certain cluster member, the network side may first tempt to send the data through the primary cluster-head. If it fails after certain predefined or preconfigured time duration, the network side may try to use the secondary cluster-head(s) route to the cluster member.

After the primary and secondary cluster-heads are determined, in some other embodiments of the present disclosure, if a secondary cluster-head becomes better than the primary cluster-head based on a new round of voting/selecting results or based on new radio quality report for the sidelinks, the primary cluster-head may be replaced by the secondary cluster-head. In another example, if the link quality of the primary cluster-head to some cluster members drops below a certain threshold while one a secondary cluster-head can have a better link quality to all devices in the cluster, the primary cluster-head may be also replaced by the secondary cluster-head. In yet another example, when a cluster member loses connection to its primary cluster-head, the cluster member may turn to contact to its secondary cluster-head to request the secondary cluster-head to act as its primary cluster-head. In view of the above, embodiments of the present disclosure also provide mechanisms as follows.

In some embodiments, in response to a predetermined event, the secondary cluster-head may be determined as a new primary cluster-head. The predetermined event may be predefined in a variety of forms. In an embodiment, the predetermined event may be a capability metric of the secondary cluster-head being better than a capability metric of the primary cluster-head. In another embodiment, the predetermined event may be a link quality of the primary cluster-head to a network node being lower than a link quality of the secondary cluster-head. In yet another embodiment, the predetermined event may be a device in the cluster losing a connection to the primary cluster-head and setting up a connection to the secondary cluster-head. When the secondary cluster-head is determined as a new primary cluster-head, the original primary cluster-head may move out of the cluster, act as a normal cluster member, act as a new secondary cluster-head, or in other possible status. If the original primary cluster-head still can communicate with the new primary cluster-head, in some embodiments, the original primary cluster-head may send a context of device(s) in the cluster served by the original primary cluster-head to the new primary cluster-head.

The roles of primary or secondary cluster-heads may be exchangeable to better adapt to the network status change due to mobility, cluster-head loading balancing, and other reasons. Also, a cluster-head is replaceable by a new CH-capable node if needed. Thus, there may be a change of the cluster-head(s), for example, but not limited to, adding a new cluster-head, removing a cluster-head, exchanging the roles of the primary cluster-head with the secondary cluster-head, and/or the like. In some embodiments, in response to a change of at least one of the primary cluster-head and the secondary cluster-head, information about the change may be sent to a device in the cluster served by the primary cluster-head or the secondary cluster-head and to a network node. In an embodiment, in response to a change of the secondary cluster-head, control channel configuration of the secondary cluster-head may be sent to a device in the cluster. Thus, the cluster member may have the configuration of the new secondary cluster-head and subsequently set up a connection the new cluster-head(s) based thereon.

In some embodiments, the rules of the change of the primary and/or secondary cluster-heads may be determined according to the voting results for cluster-heads selection, configured cluster-heads set size, and/or the like. The highest scored device in the cluster may be selected as a primary cluster-head. The secondary cluster-heads may be determined according to a descending order of their scores.

Optionally, embodiments of the present disclosure provide a mechanism in case of the change of cluster member(s). In some embodiments, if any of the cluster members is changed, for example, leaving the cluster or being added to the cluster, the primary cluster-head may trigger a new round of voting/reporting of each cluster member. The highest scored candidate cluster-head may be elected and primary cluster-head may hand over the new cluster-head by exchange context information of the cluster members. To a cluster-head, the removal of its service to a cluster member may be performed when the cluster member moves out of the service providing area. The served cluster member may provide channel measurement results and provide either periodic or event-triggered reports to the primary cluster-head and the primary cluster-head determines the removal.

Optionally, in some embodiments, the primary cluster-head may broadcast the change of the primary and/or secondary cluster-heads to devices the cluster. The changed cluster-heads may announce their supporting carriers and/or switching time points between different carriers for easy joining of new members. The announcement may be done by either a new primary cluster-head or a leaving primary cluster-head node immediately after the replacement of the primary cluster-head. The announcement helps the served cluster member nodes re-attach to the new primary cluster-head.

Optionally, in some embodiments, the primary cluster-head may report the change of the primary and/or secondary cluster-heads to the network node. This may speed up a secondary cluster-head to setup radio connection with the network side. For instance, the network side may prepare the RAN context for the secondary cluster-head in advance.

Optionally, in some embodiments, the primary and/or the secondary cluster-heads may acquire/report from/to the network side for information about possible multiple cluster-heads serving one cluster member. Additionally, in some embodiments, the cluster member may report its primary cluster-head when a new cluster-head is associated with it as a secondary cluster-head. Fast primary cluster-head takeover may be supported in case of absence of a primary cluster-head. There may be a variety of situations. In an embodiment, if the original primary cluster-head can still communicate with the network side, it may report it loses connection to its slave device (that is, a device in the cluster that was served by the original primary cluster-head) and the newest cluster set information to network side, wherein the cluster set information may indicate information about the original primary cluster-head, the new primary cluster-head and/or the secondary cluster-heads(s). Then, the network side may appoint the new primary cluster-head for the cluster.

In another embodiment, if the original primary cluster-head can still communicate with the best secondary cluster-head, it may configure the secondary cluster-head to take over the primary cluster-head and forwards the contexts of the slave device to the new primary cluster-head.

In yet another embodiment, if the slave device loses connection to its primary cluster-head, it may try to set up radio link with the secondary cluster-head according to pre-configuration on the secondary cluster-head.

Optionally, in some embodiments, the primary cluster-head may take all the data traffic and broadcast control channel configurations of the secondary cluster-heads respectively to the slave device at the change of the secondary cluster-head.

Optionally, in some embodiments, a slave device may connect with multiple cluster-heads and served by multiple cluster-heads at the same time. Load balance may be performed between the primary and secondary cluster-heads if the primary cluster-head is configured. In this way, cluster-head tasks may be shared within a set of primary and secondary cluster-heads to balance the loading among them. For instance, beaconing for discovery, synchronizing sources, RRM, data-gateway may be separately taken by the cluster members. Transition of each responsibility may be carried out independently. Such independent work-load assignment may benefit the balance on power consumption, radio-resource, processing power, and/or spectrum spatially reuse of devices in the cluster.

In addition, each of tasks may rotate among the primary cluster-head and the secondary cluster head(s) from time to time, if such an adjustment is necessary to adapt to the changes of link quality, mobility, battery status, and so on. In some embodiments, same data or same control signaling may go through the multiple cluster-heads to or from the cluster members for diversity gain or latency shortening.

Optionally, in some embodiments, contexts of the cluster members may be shared among the primary cluster-head and the secondary cluster head(s). This may include backing-up cluster members' cellular and cluster identifications, radio bears configuration, member nodes' capacity and capability in transmissions, physical control channel mapping, synchronization sequence parameters, data gateway setup parameters, and so on.

Backup and sharing among the primary cluster-head and the secondary cluster head(s) facilities seamless cluster management when primary and/or secondary cluster-heads change (also referred to as "cluster-head role change"). Such operations may be triggered by an event when detecting any likelihood that the topology of the cluster would be change or loading status of each cluster-head is changing to a sufficient extent that there is a need to do the cluster-head role change. Otherwise, cluster management may be paused due to the topology change.

Alternatively, in some embodiments, contexts of the cluster members may be shared among the cluster-heads periodically. This benefits the case when there is a high likelihood that the cluster-head role change happens frequently. The period may be set based on the possible change rate, so as to adapt to the change rate.

Robustness and continuation of cluster management may be facilitated by such shared contexts of the cluster members. In this way, the mobility and imbalanced workload triggered interruptions of cluster management can be reduced.

Figure 9:
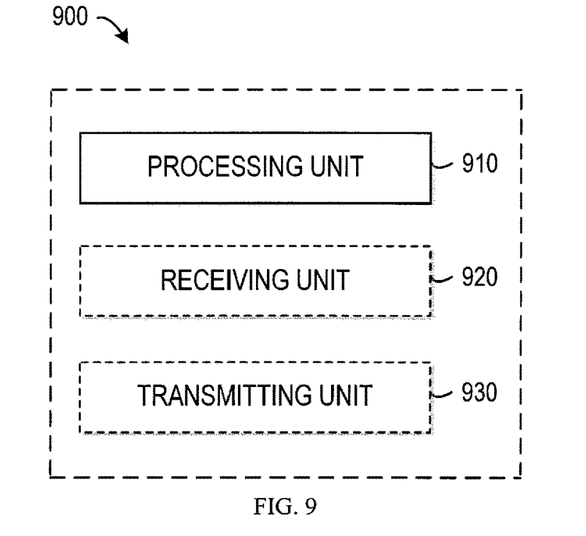
FIG. 9 shows a block diagram of a device 900 in accordance with an embodiment of the present disclosure.

FIG. 9 shows a block diagram of a device 900 in accordance with an embodiment of the present disclosure. It would be appreciated that the device 900 may be implemented as the cluster-head 110 or 140, the network node 101, a controller or a server in or out of the cluster, or other suitable devices.

As shown, the device 900 includes a processing unit 910. The processing unit 910 is configured to select candidate cluster-heads from a cluster of devices; determine a primary cluster-head for serving the cluster of devices from the candidate cluster-heads; and determine a secondary cluster-head from the candidate cluster-heads based on the primary cluster-head. The secondary cluster-head serves the cluster of devices as a supplementary of the primary cluster-head.

In an embodiment, the processing unit 910 may be further configured to: determine capability metrics of devices in the cluster, the capability metrics including at least one of: data-path-latency status, interference status, link budget, capability of multiple operating carriers, media-access-control features, and reachability in term of radio coverage; rank the devices in the cluster based on the determined capability metrics; and select the candidate cluster-heads from the devices in the cluster based on the ranking.

In an embodiment, the device 900 may optionally include a receiving unit 920. The receiving unit 920 may be configured to receive votes from the devices in the cluster, each of the votes indicating a candidate cluster-head that is preferred by one of the devices. In the embodiment, the processing unit 910 may be further configured to select the candidate cluster-heads from the devices based on the votes.

In an embodiment, the processing unit 910 may be further configured to: determine capability metrics of the candidate cluster-heads, the capability metrics including at least one of: data-path-latency status, interference status, link budget, capability of multiple operating carriers, media-access-control features, and reachability in term of radio coverage; and determine, as the primary cluster-head, one of the candidate cluster-heads with the determined capability metric meeting a predetermined criterion.

In an embodiment, the device 900 may optionally include a receiving unit 920. The receiving unit 920 may be configured to receive votes from the candidate cluster-heads, each of the votes indicating a primary cluster-head that is preferred by one of the devices. In the embodiment, the processing unit 910 may be further configured to determine, as the primary cluster-head, one of the candidate cluster-heads with the vote meeting a predetermined criterion.

In an embodiment, the processing unit 910 may be further configured to: obtain operating information of the candidate cluster-heads other than the primary cluster-head, the operating information including at least one of: operating protocols, operating bands, and capabilities of inter-cluster-head communications; and determine the secondary cluster-head based on the operating information.

In an embodiment, the device 900 may optionally include a receiving unit 920. The receiving unit 920 may be configured to receive a recommendation of the secondary cluster-head from the primary cluster-head. The recommendation may be determined based on operating information of the candidate cluster-heads other than the primary cluster-head. The operating information may include at least one of: operating protocols, operating bands, and suitability of inter-cluster-head communications. In the embodiment, the processing unit 910 may be further configured to determine the secondary cluster-head based on the recommendation.

In an embodiment, the processing unit 910 may be further configured to in response to a predetermined event, select the secondary cluster-head as a new primary cluster-head, the predetermined event including at least one of the following: a capability metric of the secondary cluster-head being better than a capability metric of the primary cluster-head, a link quality of the primary cluster-head to a network node being lower than a link quality of the secondary cluster-head, and a device in the cluster losing a connection to the primary cluster-head and setting up a connection to the secondary cluster-head.

In an embodiment, the primary cluster-head may send a context of a device in the cluster served by the primary cluster-head to the new primary cluster-head.

In an embodiment, the device 900 may optionally include a transmitting unit 930. The transmitting unit 930 may be configured to: in response to a change of at least one of the primary cluster-head and the secondary cluster-head, send information about the change to a device in the cluster served by the primary cluster-head or the secondary cluster-head and to a network node.

In an embodiment, the device 900 may optionally include a transmitting unit 930. The transmitting unit 930 may be configured to: in response to a change of the secondary cluster-head, send control channel configuration of the secondary cluster-head to a device in the cluster.

In an embodiment, the device 900 may optionally include a transmitting unit 930. The transmitting unit 930 may be configured to: send, to the secondary cluster-head, a context of a device in the cluster served by the primary cluster-head to facilitate a connection to be set up between the device in the cluster and the secondary cluster-head.

In an embodiment, the primary cluster-head and the secondary cluster-head may be specific to a device in the cluster.

In an embodiment, a device in the cluster may connect to both the primary cluster-head and the secondary cluster-head according to a load balance rule. The load balance rule may relate to at least one of: power consumption, radio resource, processing energy, and spectrum spatially reuse.

In an embodiment, the primary cluster-head may have a higher priority than the secondary cluster-head. In an embodiment, if a network node fails to transmit a signal to the primary cluster-head, the network node may transmit the signal to the secondary cluster-head to facilitate the signal to be transmitted to a device in the cluster.

It should be appreciated that components included in the device 900 correspond to the operations of any of the methods 200-800. Therefore, all operations and features described above with reference to FIGS. 2-8 are likewise applicable to the components included in the device 900 and have similar effects. For the purpose of simplification, the details will be omitted.

The components included in the device 900 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the components included in the device 900 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 10:
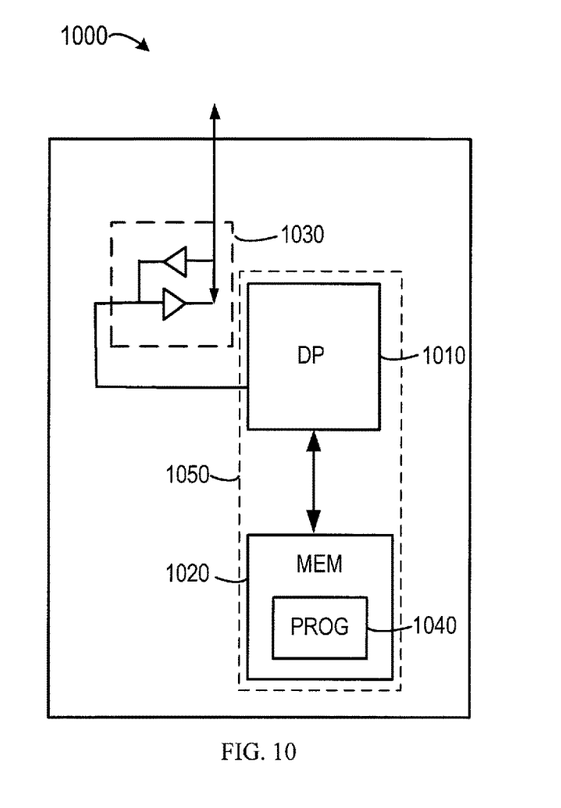
FIG. 10 shows a simplified block diagram 1000 of a device that is suitable for use in implementing embodiments of the present disclosure.

FIG. 10 shows a simplified block diagram of a device 1000 that is suitable for implementing embodiments of the present disclosure. It would be appreciated that the device 1000 may be implemented as at least a part of, for example, the device 900.

As shown, the device 1000 includes a communicating means 1030 and a processing means 1050. The processing means 1050 includes a data processor (DP) 1010, a memory (MEM) 1020 coupled to the DP 1010. The communicating means 1030 is coupled to the DP 1010 in the processing means 1050. The MEM 1020 stores a program (PROG) 1040. The communicating means 1030 is for communications with other devices in the same or different layer.

The PROG 1040 is assumed to include program instructions that, when executed by the associated DP 1010, enable the device 1000 to operate in accordance with the embodiments of the present disclosure, as discussed herein with the method 200, 300 or 400. The embodiments herein may be implemented by computer software executable by the DP 1010 of the device 1000, or by hardware, or by a combination of software and hardware. A combination of the data processor 1010 and MEM 1020 may form processing means 1050 adapted to implement various embodiments of the present disclosure.

The MEM 1020 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 1000, there may be several physically distinct memory modules in the device 1000. The DP 1010 may be of any type suitable to the local technical environment, and may include one or more of general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. The machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method at least partially implemented at a device, comprising:

selecting candidate cluster-heads from a cluster of devices;

determining a primary cluster-head for serving the cluster of devices from the candidate cluster-heads; and determining a secondary cluster-head from the candidate cluster-heads based on the primary cluster-head and operating protocols of the candidate cluster-heads other than the primary cluster-head, the secondary cluster-head serving the cluster of devices as a supplementary of the primary cluster-head.

2. The method according to claim 1, wherein selecting the candidate cluster-heads comprises:

determining capability metrics of devices in the cluster, the capability metrics including at least one of: data-path-latency status, interference status, link budget, capability of multiple operating carriers, media-access-control features, and reachability in term of radio coverage;

ranking the devices in the cluster based on the determined capability metrics; and selecting the candidate cluster-heads from the devices in the cluster based on the ranking.

3. The method according to claim 1, wherein selecting the candidate cluster-heads comprises:

receiving votes from the devices in the cluster, each of the votes indicating a candidate cluster-head that is preferred by one of the devices; and selecting the candidate cluster-heads from the devices based on the votes.

4. The method according to claim 1, wherein determining the primary cluster-head comprises:

determining capability metrics of the candidate cluster-heads, the capability metrics including at least one of: data-path-latency status, interference status, link budget, capability of multiple operating carriers, media-access-control features, and reachability in term of radio coverage; and determining, as the primary cluster-head, one of the candidate cluster-heads with the determined capability metric meeting a predetermined criterion.

5. The method according to claim 1, wherein determining the primary cluster-head comprises:

receiving votes from the candidate cluster-heads, each of the votes indicating a primary cluster-head that is preferred by one of the devices; and determining, as the primary cluster-head, one of the candidate cluster-heads with the vote meeting a predetermined criterion.

6. The method according to claim 1, further comprising:

obtaining operating information of the candidate cluster-heads other than the primary cluster-head, the operating information including at least one of: operating protocols, operating bands, and capabilities of inter-cluster-head communications.

7. The method according to claim 1, wherein determining the secondary cluster-head comprises:

receiving a recommendation of the secondary cluster-head from the primary cluster-head, the recommendation being determined based on the operating protocols of the candidate cluster-heads other than the primary cluster-head; and determining the secondary cluster-head based on the recommendation.

8. The method according to claim 1, further comprising:

in response to a predetermined event, selecting the secondary cluster-head as a new primary cluster-head, the predetermined event including at least one of the following:

a capability metric of the secondary cluster-head being better than a capability metric of the primary cluster-head, a link quality of the primary cluster-head to a network node being lower than a link quality of the secondary cluster-head, and a device in the cluster losing a connection to the primary cluster-head and setting up a connection to the secondary cluster-head.

9. The method according to claim 8, wherein the primary cluster-head sends a context of a device in the cluster served by the primary cluster-head to the new primary cluster-head.

10. The method according to claim 1, further comprising:

in response to a change of at least one of the primary cluster-head and the secondary cluster-head, sending information about the change to a device in the cluster served by the primary cluster-head or the secondary cluster-head and to a network node.

11. The method according to claim 1, further comprising:

in response to a change of the secondary cluster-head, sending control channel configuration of the secondary cluster-head to a device in the cluster.

12. The method according to claim 1, further comprising:

sending, to the secondary cluster-head, a context of a device in the cluster served by the primary cluster-head to facilitate a connection to be set up between the device in the cluster and the secondary cluster-head.

13. The method according to claim 1, wherein the primary cluster-head and the secondary cluster-head are specific to a device in the cluster.

14. The method according to claim 1, wherein a device in the cluster connects to both the primary cluster-head and the secondary cluster-head according to a load balance rule, the load balance rule relating to at least one of: power consumption, radio resource, processing energy, and spectrum spatially reuse.

15. The method according to claim 1, wherein the primary cluster-head has a higher priority than the secondary cluster-head, and wherein if a network node fails to transmit a signal to the primary cluster-head, the network node transmits the signal to the secondary cluster-head to facilitate the signal to be transmitted to a device in the cluster.

16. A device, comprising:

a processor configured to:

select candidate cluster-heads from a cluster of devices;

determine a primary cluster-head for serving the cluster of devices from the candidate cluster-heads; and determine a secondary cluster-head from the candidate cluster-heads based on the primary cluster-head and operating protocols of the candidate cluster-heads other than the primary cluster-head, the secondary cluster-head serving the cluster of devices as a supplementary of the primary cluster-head.

17. The device according to claim 16, wherein the processor is further configured to:

determine capability metrics of devices in the cluster, the capability metrics including at least one of: data-path-latency status, interference status, link budget, capability of multiple operating carriers, media-access-control features, and reachability in term of radio coverage;

rank the devices in the cluster based on the determined capability metrics; and select the candidate cluster-heads from the devices in the cluster based on the ranking.

18. The device according to claim 16, further comprising a receiver configured to receive votes from the devices in the cluster, each of the votes indicating a candidate cluster-head that is preferred by one of the devices,
wherein the processor is further configured to select the candidate cluster-heads from the devices based on the votes.

19. The device according to claim 16, wherein the processor is further configured to:
determine capability metrics of the candidate cluster-heads, the capability metrics including at least one of: data-path-latency status, interference status, link budget, capability of multiple operating carriers, media-access-control features, and reachability in term of radio coverage; and
determine, as the primary cluster-head, one of the candidate cluster-heads with the determined capability metric meeting a predetermined criterion.

20. The device according to claim 16, further comprising a receiver configured to receive votes from the candidate cluster-heads, each of the votes indicating a primary cluster-head that is preferred by one of the devices,
wherein the processor is further configured to determine, as the primary cluster-head, one of the candidate cluster-heads with the vote meeting a predetermined criterion.

21. The device according to claim 16, wherein the processor is further configured to:
obtain operating information of the candidate cluster-heads other than the primary cluster-head, the operating information including at least one of: operating protocols, operating bands, and capabilities of inter-cluster-head communications.

22. The device according to claim 16, further comprising a receiver configured to receive a recommendation of the secondary cluster-head from the primary cluster-head, the recommendation being determined based on the operating protocols of the candidate cluster-heads other than the primary cluster-head,
wherein the processor is further configured to determine the secondary cluster-head based on the recommendation.

23. The device according to claim 16, wherein the processor is further configured to:
in response to a predetermined event, select the secondary cluster-head as a new primary cluster-head, the predetermined event including at least one of the following:
a capability metric of the secondary cluster-head being better than a capability metric of the primary cluster-head,
a link quality of the primary cluster-head to a network node being lower than a link quality of the secondary cluster-head, and
a device in the cluster losing a connection to the primary cluster-head and setting up a connection to the secondary cluster-head.

24. The device according to claim 16, further comprising a transmitter configured to:
in response to a change of at least one of the primary cluster-head and the secondary cluster-head, send information about the change to a device in the cluster served by the primary cluster-head or the secondary cluster-head and to a network node.

25. The device according to claim 16, further comprising a transmitter configured to:
send, to the secondary cluster-head, a context of a device in the cluster served by the primary cluster-head to facilitate a connection to be set up between the device in the cluster and the secondary cluster-head.

26. The device according to claim 16, wherein a device in the cluster connects to both the primary cluster-head and the secondary cluster-head according to a load balance rule, the load balance rule relating to at least one of: power consumption, radio resource, processing energy, and spectrum spatially reuse.

27. A device, comprising:
a processor and a memory, the memory containing program including instructions executable by the processor, the processor being configured to cause the device to perform the method according to claim 1.

28. A computer program product being tangibly stored on a non-transitory computer readable storage medium and including instructions which, when executed on a processor of a device, cause the device to perform the method according to claim 1.

* * * * *